(12) United States Patent
Ma et al.

(10) Patent No.: US 10,540,254 B2
(45) Date of Patent: Jan. 21, 2020

(54) TECHNOLOGIES FOR ANALYZING PERSISTENT MEMORY PROGRAMS

(71) Applicant: Intel Corporation, Santa Clara, CA (US)

(72) Inventors: Zhiqiang Ma, Platteville, WI (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 15/083,997

(22) Filed: Mar. 29, 2016

(65) Prior Publication Data
US 2017/0132094 A1 May 11, 2017

Related U.S. Application Data

(60) Provisional application No. 62/251,493, filed on Nov. 5, 2015.

(51) Int. Cl.
*G06F 11/00* (2006.01)
*G06F 11/36* (2006.01)

(52) U.S. Cl.
CPC .................. *G06F 11/3612* (2013.01)

(58) Field of Classification Search
CPC .................................................. G06F 11/3612
See application file for complete search history.

(56) References Cited

U.S. PATENT DOCUMENTS

| | | | | |
|---|---|---|---|---|
| 6,665,268 B1* | 12/2003 | Sato | ........................ | H04L 41/06 370/242 |
| 2004/0054990 A1* | 3/2004 | Liao | ...................... | G06F 8/4442 717/124 |
| 2005/0246207 A1* | 11/2005 | Noonan | .............. | G06F 11/3409 705/4 |
| 2015/0186250 A1* | 7/2015 | Friedler | .............. | G06F 11/3688 717/124 |
| 2015/0268992 A1* | 9/2015 | Fan | ........................ | G06F 9/4881 718/106 |
| 2017/0277523 A1* | 9/2017 | Assulin | ............... | G06F 11/3668 |

* cited by examiner

*Primary Examiner* — Christopher S McCarthy
(74) *Attorney, Agent, or Firm* — Barnes & Thornburg LLP

(57) ABSTRACT

Technologies for analyzing persistent memory programs include a computing device having persistent memory. The computing device executes a persistent memory program that includes one or more store operations to the persistent memory. The computing device records persistent memory store events of the persistent memory program and constructs a load dependency graph of the persistent memory program. The persistent memory store events may include persistent memory stores, cache flush events, memory fence events, and persistent memory commit events. The computing device replays the persistent memory store events and analyzes the load dependency graph. The computing device may identify persistency programming errors in the persistent memory program. The computing device may identify persistent memory commit points of the persistent memory program. The computing device may identify groups of persistent memory store operations to persist atomically. Other embodiments are described and claimed.

22 Claims, 13 Drawing Sheets

```
ConstructLoadDependencyGraph()
{
  SEQUENCE H = ∅; // sequence of instruction executed
  SEQUENCE P = ∅; // sequence of persistent memory load
  GRAPH G = Null Graph; // load dependency graph for (each instruction executed S) {
    if (S loads persistent memory) {
      MEMORY A = S.MemoryOperated();
      INSTRUCTION T = S;
      while (1) {
        T = BackwardSliceInstruction(T, H); // find the previous
                                            // instruction in
                                            // slice of T in H
        if (T loads persistent memory) {
          MEMORY B = T.MemoryOperated(); // load of A depends on
                                         // earlier load of B;

add load dependency A->B to G; // use the persistent
                                         // memory offsets of A
                                         // and B to represent A
                                         // and B respectively
                                         // in G
          break;
        } if (T is the first instruction in H)
          break; // no more instruction in history.
                 // load of A does not depend on any other load
      }
      P.append(A);
    }
    H.append(S);
  }
}
```

FIG. 5

```
DetectPersistencyProgrammingErrors(GRAPH G)                                  800
{
  SET Q = ∅;  // persistent stores
  SET F = ∅;  // cache lines flushed
  SET FF = ∅; // cache lines flushed and fenced
  SET C = ∅;  // committed for (each persistent memory event replayed T) {
    switch (T.type) {
      case STORE:
        MEMORY W = T.MemoryOperated();
        /*
         * find all memory locations which W load depends on in
         * graph G
         * converts offsets to addresses in L
         */
        MEMORY SET L = PersistentMemoryLoadDependsOn(W, G);

for (each memory Y ∈ (Q ∪ F ∪ FF ∪ C) ∩ L ) {
          if (Y ∈ Q) {
            report Y is not flushed and not committed;
            Q = Q - {Y};
          }
          if (Y ∈ F) {
            report Y is not committed;
            report store fence is missing after Y cache line
              flush;
            F = F - {Y};
          }
          if (Y ∈ FF) {
            report Y is not committed;
            FF = FF - {Y};
          }
          if (Y ∈ C) {
            report Y is committed but store fence missing;
            C = C - {Y};
          }
        }
        Q = Q ∪ {W};
        break;

```
/* Continued from FIG. 8A */ case CLFLUSH:
        CACHELINE CL = T.CacheLineAddress();
        if (CL ∈ Q) { // in case that a memory location spans
                      // multiple cache lines, the memory
                      // location is broken up into multiple
                      // memory locations
          Q = Q - {CL}; // in case a cache line covers multiple
                        // memory locations in Q, all these
                        // locations are removed from Q and added
                        // to F
          F = F ∪ {CL};
        }
        else {
          report T is a redundant cache line flush;
        }
        break;

case SFENCE:
        FF = FF ∪ F;
        F = ∅;
        C = ∅;
        break;

case PCOMMIT:
        if (F != ∅) {
          report store fence is missing before PCOMMIT
            instruction;
        }
        if ((F == ∅) && (FF == ∅)) {
          report T is a redundant PCOMMIT instruction;
        }
        C = C ∪ FF;
        FF = ∅;
        break;
    }
  }
}
```

FIG. 8B

```
DiscoverStoreCommitPoints(GRAPH G)
{
  SEQUENCE Q = ∅; // persistent stores for (each persistent memory store replayed T) {
    MEMORY W = T.MemoryOperated();

/*
     * find all memory locations which W load depends on in
     * graph G
     * also converts offsets to addresses in L
     */
    MEMORY SET L = PersistentMemoryLoadDependsOn(W, G);

for (each memory Y ∈ Q ∩ L) {
      report store of Y must become durable before T
    }

```
DiscoverStoresToPersistAtomically(GRAPH G)
{
  SET Q = ∅; // persistent stores /*
   * find all cycles in G
   * also converts offsets to addresses in each cycle
   */
  CYCLES CS = G.CalculateAllCycles();
  BOOLEAN F;

for (each persistent memory store replayed T) {
    MEMORY W = T.MemoryOperated();

F = 0;
    for (each cycle C in CS) {
      if (Q ∪ {W} ⊆ C) {
        Q = Q ∪ {W};
        F = 1;
        break;
      }
    } if (F == 0) {
      if (Q ≠ ∅) {
        report that all memory stores in Q have to persist
          atomically;
        Q = ∅;
      }
      for (each cycle C in CS) {
        if (W ∈ C) {
          Q = Q ∪ {W};
          break;
        }
      }
    }
  }
}
```

FIG. 12

TECHNOLOGIES FOR ANALYZING PERSISTENT MEMORY PROGRAMS

CROSS-REFERENCE TO RELATED APPLICATIONS

The present application claims priority under 35 U.S.C. § 119(e) to U.S. Provisional Patent Application Ser. No. 62/251,493, entitled "TECHNOLOGIES FOR ANALYZING PERSISTENT MEMORY PROGRAMS," which was filed on Nov. 5, 2015.

BACKGROUND

Some computing systems include persistent memory, which may be byte-addressable, cacheable, high-performance, non-volatile memory. Persistent memory may provide performance comparable to traditional volatile random access memory (RAM) while also providing data persistence. However, persistent memory may present additional challenges to application developers. In particular, application developers may have to guarantee that at any given time, data in persistent memory is consistent. Otherwise, unexpected failures such as hardware failures or power failures may result in data corruption.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is pseudocode illustrating at least one embodiment of the method for determining load dependencies of FIG. 4;

FIGS. 8A and 8B are pseudocode illustrating at least one embodiment of the method for detecting persistency programming errors of FIG. 6;

FIG. 10 is pseudocode illustrating at least one embodiment of the method for discovering store commit points of FIG. 9;

FIG. 12 is pseudocode illustrating at least one embodiment of the method for discovering stores to persist atomically of FIG. 11.

DETAILED DESCRIPTION OF THE DRAWINGS

Figure 1:
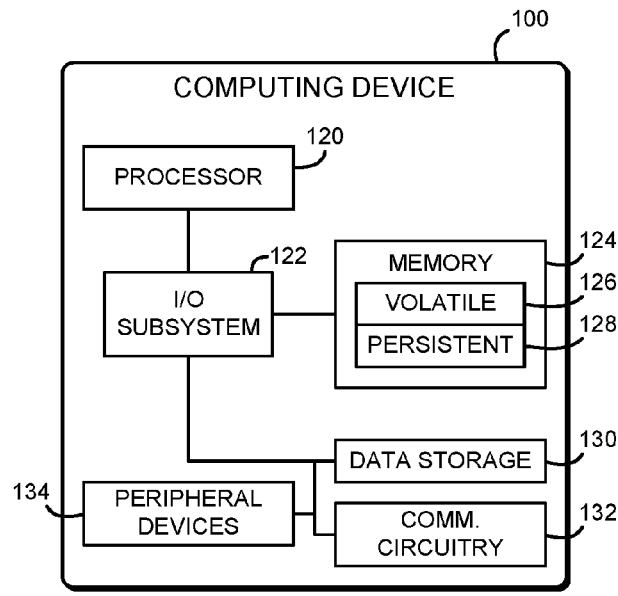
FIG. 1 is a simplified block diagram of at least one embodiment of a computing device for analyzing persistent memory programs.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a computing device 100 for analyzing persistent memory programs performs a two-phase analysis. In the first phase, the computing device 100 executes an instrumented target program and records persistent memory events such as stores, cache line flushes, memory fences, and/or persistent memory commits. The computing device 100 also analyzes memory loads to construct a load dependency graph of the target program. In the second phase, the computing device 100 replays the persistent memory store events and analyzes the target program using the load dependency graph. The computing device 100 may identify persistency programming errors, find appropriate commit points in the target program, and/or identify groups of memory stores that should be persisted atomically. Thus, the computing device 100 may be used to automatically catch programming bugs and otherwise improve the quality of persistent memory programs. In particular, the computing device 100 may automatically discover and/or debug data persistence orders to not leave data structures in a corrupted or invalid state in the event of power failures or other system failures. By identifying store commit points, groups of memory stores that should persist atomically, and/or other persistent memory programming errors, developers may place flush, fence, and/or commit instructions at appropriate locations in the target program. Additionally, although illustrated as analyzing a persistent memory program, it should be understood that the technologies of this disclosure may also be used to analyze programs and other systems that flush data from volatile buffers into non-volatile storage (e.g., programs that must flush data from I/O buffers to a mass storage device).

Figure 13:
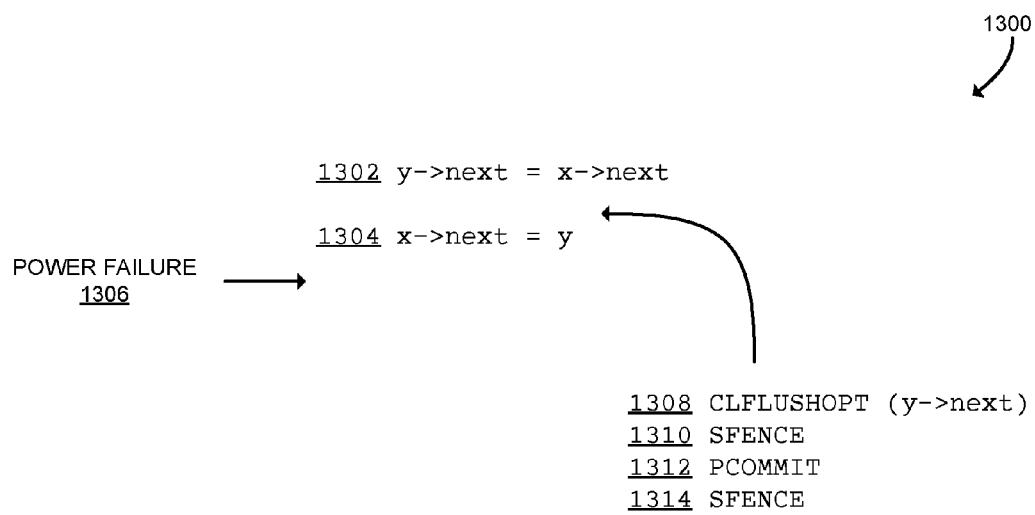
FIG. 13 is pseudocode illustrating persistent memory store persistence order.

Referring now to FIG. 13, pseudocode 1300 illustrates persistent memory store persistence order and an example of a potential persistent memory programming error. Pseudocode 1300 illustrates a persistent memory program that inserts a node y after a node x in a singly linked list stored in persistent memory. As shown, the illustrative program includes a statement 1302 to store a value to y→next, followed by a statement 1304 to store a value to x→next. For many computing devices 100, the updates to y→next and x→next may become durable at different times, based on cache and memory subsystem behaviors. Thus, in that example, a power failure 1306 may cause data corruption if the update to x→next of statement 1304 becomes durable but the update to y→next of statement 1302 does not. Therefore, to prevent data corruption, the persistent memory program may include instructions 1308, 1310, 1312, 1314 to flush, memory fence, and commit the store to y→next of statement 1302 prior to executing statement 1304. In the illustrative embodiment, instruction 1308 includes a CLFLUSHOPT instruction, which writes out the cache line(s) associated with y→next to the memory subsystem. The instruction 1310 includes an SFENCE instruction, which enforces the order of the instruction 1308 with respect to subsequent commits. The instruction 1312 includes a PCOMMIT instruction, which commits stores accepted in the memory subsystem to the persistent memory. The instruction 1314 includes an SFENCE instruction, which enforces the order of the instruction 1312 with respect to subsequent stores.

Referring again to FIG. 1, the computing device 100 may be embodied as any type of computing device capable of performing the functions described herein, including, without limitation, a computer, a workstation, a multiprocessor system, a server, a rack-mounted server, a blade server, a laptop computer, a notebook computer, a mobile computing device, a wearable computing device, a network appliance, a web appliance, a distributed computing system, a processor-based system, and/or a consumer electronic device. As shown in FIG. 1, the computing device 100 includes a processor 120, an input/output subsystem 122, a memory 124, a data storage device 130, and communication circuitry 132. Of course, the computing device 100 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 further includes volatile memory 126 and persistent memory 128. The volatile memory 126 may be embodied as traditional RAM, meaning that any data contained in the volatile memory 126 is lost when power is removed from the computing device 100 and/or the volatile memory 126. The persistent memory 128 may be embodied as any byte-addressable, high-performance, non-volatile memory. For example, the persistent memory 128 may be embodied as battery-backed RAM, phase-change memory, memristor-based memory, or other types of persistent memory. The persistent memory 128 may include programs and data similar to the volatile memory 126; however, the contents of the persistent memory 128 are retained for at least some period of time when power is removed from the computing device 100 and/or the persistent memory 128.

Accesses to the persistent memory 128 are through processor 120 load/store instructions. In other words, persistent memory accesses share the same micro-architectural resources of the processor/platform as volatile memory 126 accesses. These resources may include the processor 120 store buffers, coherency caches (e.g., L1/L2/LLC, etc.), any memory-side caches, on-chip and off-chip interconnect buffers, memory controller write buffers, etc. Therefore, data included in a store to the persistent memory 128 does not become durable immediately after the store instruction completes. Instead, the data becomes durable only after the data has been committed to the targeted persistent memory 128. This also means that the data store order or program order may not be the same as the persistence order, that is, the order in which the data is committed to the non-volatile device 128 and becomes durable. Programming errors relating to the data persistence order—exactly where and when the data becomes durable—may cause data structures to become corrupted or otherwise cause invalid state in the event of power failure or other system failure.

In order to allow software to manage persistence, certain processors 120 may support specialized instructions to manage data persistence. For example, certain processors 120 manufactured by Intel® Corporation support instructions including: CLFLUSH, CLFLUSHOPT, CLWB, and PCOMMIT. CLFLUSHOPT is an optimized version of CLFLUSH. Both CLFLUSHOPT and CLWB write out a cache line specified as its argument to the memory subsystem. PCOMMIT, without taking any arguments, commits stores accepted in the memory subsystem to the non-volatile memory device 128. Only after PCOMMIT completes is the store guaranteed to be durable. Additionally, those processors 120 also support the SFENCE instruction, which may enforce the order of CLFLUSHOPT with respect to subsequent PCOMMIT and the order of PCOMMIT with respect to subsequent stores. Thus, to guarantee a store instruction becomes durable before a following store instruction, the programmer may include a sequence of instructions CLFLUSHOPT, SFENCE, PCOMMIT, and SFENCE after the store instruction. These instructions may be defined and exposed as intrinsic functions in C/C++ compilers for developers (e.g., as intrinsic functions _mm_clflushopt ( ), _ mm_sfence( ), and/or _mm_pcommit( )).

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. Access to the data storage device 130 may be much slower than to the persistent memory 128. Additionally, the data storage device 130 may be accessed through a block device, file system, or other non-byte-addressable interface.

The communication circuitry 132 of the computing device 100 may be embodied as any communication circuit, device, or collection thereof, capable of enabling communications between the computing device 100 and other remote devices over a computing network. The communication circuitry 132 may be configured to use any one or more communication technology (e.g., wired or wireless communications, Ethernet, Bluetooth®, Wi-Fi®, WiMAX, etc.) and associated protocols (e.g., TCP, UDP, etc.) to effect such communication.

In some embodiments, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, and/or other input/output devices, interface devices, and/or peripheral devices.

Figure 2:
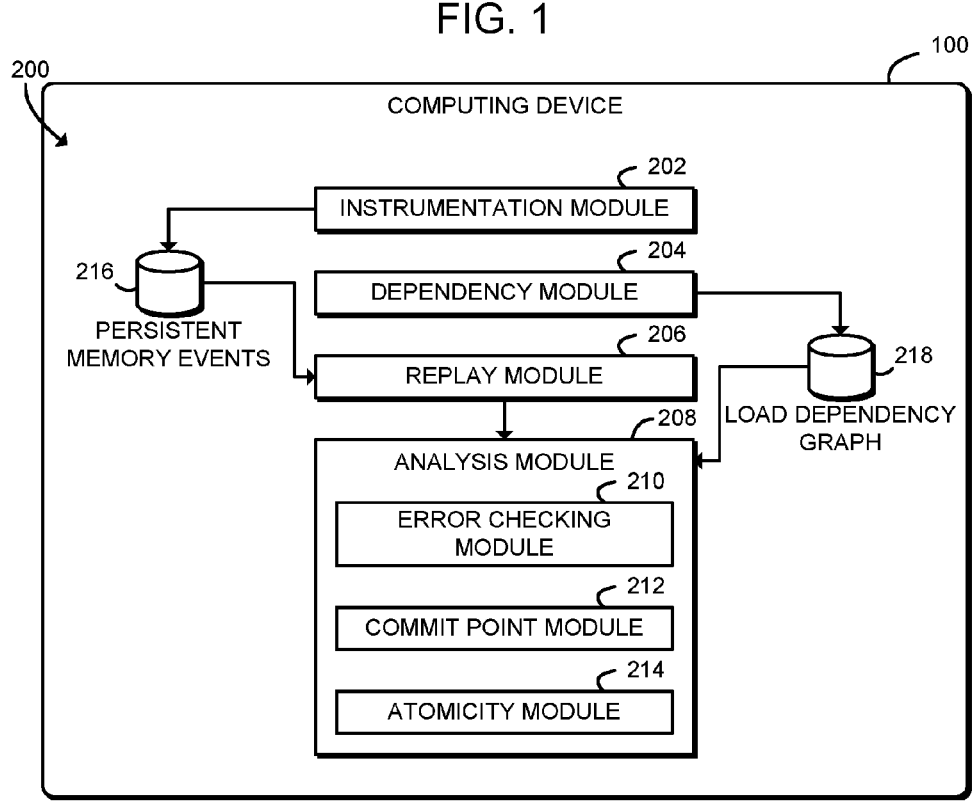
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an instrumentation module 202, a dependency module 204, a replay module 206, and an analysis module 208. The various modules of the environment 200 may be embodied as hardware, firmware, software, or a combination thereof. As such, in some embodiments, one or more of the modules of the environment 200 may be embodied as circuitry or collection of electrical devices (e.g., instrumentation circuitry 202, dependency circuitry 204, replay circuitry 206, and/or analysis circuitry 208). It should be appreciated that, in such embodiments, one or more of the instrumentation circuitry 202, the dependency circuitry 204, the replay circuitry 206, and/or the analysis circuitry 208 may form a portion of one or more of the processor 120, the I/O subsystem 122, and/or other components of the computing device 100. Additionally, in some embodiments, one or more of the illustrative modules may form a portion of another module and/or one or more of the illustrative modules may be independent of one another.

The instrumentation module 202 is configured to execute a persistent memory program. The persistent memory program includes one or more store operations to the persistent memory 128. The instrumentation module 202 is further configured to record persistent memory store events 216 of the persistent memory program in response to executing the persistent memory program. The persistent memory store events 216 may include persistent memory store operations as well as persistent memory flush events, persistent memory commit events, persistent memory fence events, and/or other memory fencing events.

The dependency module 204 is configured to construct a load dependency graph 218 of the persistent memory program in response to executing the persistent memory program. The load dependency graph 218 is a directed graph of load dependencies between persistent memory locations. As described further below, a load dependency between memory locations indicates that a memory load of a memory location occurs after a memory load of another memory location, that the later load depends on the other memory location (i.e., through a data dependency or a control dependency), and that there is no intervening memory store to the memory location of the later load.

The replay module 206 is configured to replay the persistent memory store events 216. The analysis module 208 is configured to analyze the replayed persistent memory store events 216 using the load dependency graph 218 in response to replaying the persistent memory store events 216. The analysis module 208 may be configured to identify one or more persistency programming errors of the persistent memory program based on the load dependency graph 218, identify one or more persistent memory commit points of the persistent memory program based on the load dependency graph 218, and/or identify a plurality of persistent memory store operations to persist atomically based on the load dependency graph 218. In some embodiments, those functions may be performed by one or more sub-modules, such as an error checking module 210, a commit point module 212, and/or an atomicity module 214.

Figure 3:
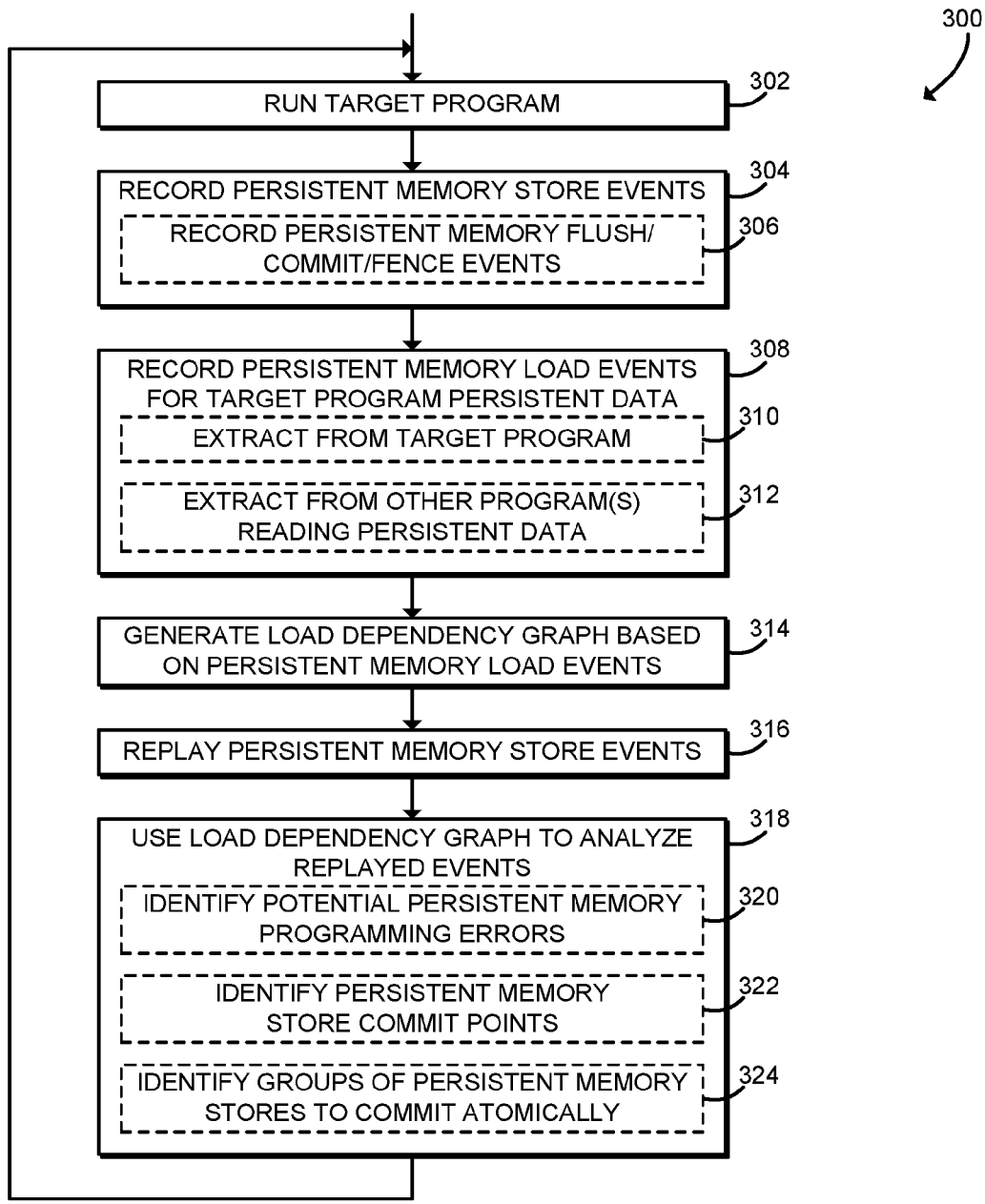
FIG. 3 is a simplified flow diagram of at least one embodiment of a method for analyzing a persistent memory program that may be executed by the computing device of FIGS. 1-2.

Referring now to FIG. 3, in use, the computing device 100 may execute a method 300 for analyzing a persistent memory program. The method 300 begins in block 302, in which the computing device 100 runs a target persistent memory program. The target persistent memory program includes one or more persistent memory operations, such as loads and/or stores that target the persistent memory 128.

In block 304, the computing device 100 records persistent memory store events 216 that occur during execution of the target persistent memory program. The store events 216 are stored for later replay as described further below. To record the store events 216, all memory store instructions of the target persistent memory program may be instrumented. The instrumentation may be done using any instrumentation framework, for example the pin binary instrumentation framework. During runtime, each memory store instruction is inspected. If the memory store address addr references a location in the persistent memory 128, a 5-tuple of <tid, ip, base, offset, size> may be recorded on a non-volatile device (e.g., the persistent memory 128 and/or a data storage device 130). In the illustrative example, tid is the identifier of the storing thread; ip is the instruction pointer; and base is the base address of the persistent memory 128. The persistent memory 128 is usually mapped into a region of the process address space. The starting address of this region is the base address and it can be obtained by instrumenting the APIs that does the mapping. The tuple also has offset=addr−base, which is the offset of the memory location in the persistent memory 128 region, and size, which is the size of memory this instruction accesses.

In some embodiments, in block 306, the computing device 100 may also record persistent memory flush, commit, and/or fence events. Those memory events correspond to execution of CLFLUSH, CLFLUSHOPT, CLWB, PCOMMIT, SFENCE instructions, and/or other memory fencing events (e.g., execution of MFENCE instructions). For each event, the computing device 100 may record a 6-tuple of <tid, ip, type, base, offset, size> on a non-volatile device. In the illustrative example, type denotes the type of event: STORE, CLFLUSH, PCOMMIT, or SFENCE.

In block 308, the computing device 100 records persistent memory 128 load events associated with the persistent data stored by the target persistent memory program. The computing device 100 records the load events in order to determine load dependencies, as described further below. In order to determine load dependencies, the computing device 100 may instrument and/or trace all operations performed by a program operating on the stored persistent memory 128 data. In some embodiments, in block 310 the computing device 100 may extract the load events from the target persistent memory program. In those embodiments, the same target program may write data to and then read the data from the persistent memory 128. In some embodiments, in block 312, the computing device 100 may extract the load events from one or more other programs that read the persistent data stored by the target persistent memory program. In other words, the target program may write data to the persistent memory 128 and a different program or programs may read the data from the persistent memory 128 after the target program completes. Additionally or alternatively, in some embodiments the load dependencies may need to be extracted from both the target program and/or one or more programs reading the data written by the target program. In such embodiments, the load dependencies extracted from each individual program may need to be aggregated into one global dependency graph 218 before analysis starts. Although illustrated in FIG. 3 as instrumenting and recording persistent memory store events and persistent memory load events that target the persistent memory 128, it should be understood that in some embodiments, the computing device 100 may instrument and record memory events that target other volatile buffers that are flushed into non-volatile storage (e.g., programs that target volatile I/O buffers that are flushed to a mass storage device).

In block 314, the computing device 100 generates a load dependency graph 218 based on the persistent memory load events. As further described below, the relationship between loads may be analyzed using the concept of load dependency. Intuitively, if a load of persistent memory A occurring after a load of persistent memory B directly or indirectly uses or is controlled by the load of B and there is no intervening memory store to A after loading of B and before loading of A, having both A and B valid requires that a store of A persists before a store of B persists. Given two different locations A and B in the persistent memory 128, a load of A depends on B if the load of A occurs after a load of B and the load of A directly or indirectly uses B or is controlled by B and there is no intervening memory store to A after loading of B and before loading of A. Given a persistent memory load A, finding an earlier persistent memory load B on which the load of A depends can be solved using dynamic backward slicing. Dynamic backward slicing may be done by program dependency analysis (control flow and data flow analysis). Instrumentation and keeping a history of every instruction executed may be required. The computing device 100 may use any appropriate technique to perform dynamic backward slicing. For example, the computing device 100 may perform dynamic slicing as described in Yan Wang et al., "*DrDebug: Deterministic Replay based Cyclic Debugging with Dynamic Slicing*." Of course, this disclosure is not limited to a specific dynamic slicing or program dependency analysis implementation. To calculate a load dependency for a persistent memory load A by an instruction I, a full program slice of I is not required. The slicing can stop whenever the last memory load B is encountered. One potential embodiment of a method for generating the load dependency graph 218 is described further below in connection FIGS. 4-5.

In block 316, the computing device 100 replays the stored persistent memory store events 216. The computing device 100 replays the stored persistent memory store events 216 in a separate phase, which may be performed after determining the load dependency graph 218 as described above. Rather than replaying an actual execution of the target program, the computing device 100 replays the persistent memory store events 216. As described above, each persistent memory store event 216 describes a particular event that occurred during instrumented execution of the target program, such as a persistent memory store operation or other events such as a persistent memory flush, fence, or commit. The computing device 100 may read each event from the persistent memory store events 216 and then dispatch the event to an analyzer. The analyzer may analyze the persistent memory store event 216 using the load dependency graph 218 as described below.

In block 318, the computing device 100 analyzes the persistent memory store events 216 using the load dependency graph 218, during replay of the persistent memory store events 216. In some embodiments, in block 320 the computing device 100 may identify potential programming errors relating to the persistent memory 128 in the target program. In particular, the computing device 100 may automatically find missing, incorrect, and/or redundant store persistence commit points in persistent memory programs. For example, the computing device 100 may detect a missing CLFLUSH/CLFLUSHOPT/CLWB instruction, a missing PCOMMIT instruction, a missing store fence (SFENCE) instruction after cache line flush, a missing store fence before PCOMMIT instruction, a missing store fence after PCOMMIT instruction, a redundant cache line flush, and/or a redundant PCOMMIT instruction. One potential embodiment of a method for identifying potential persistent memory 128 programming errors is described further below in connection with FIGS. 6-8.

In some embodiments, in block 322 the computing device 100 may identify persistent memory store commit points in the target program. A persistent memory store commit point is an execution point in the target program where one or more memory stores are flushed and committed to the persistent memory 128. For a persistent memory data structure and a set of load and store instructions operating on that data structure in a program, there exists a memory store persistence order, violations of which may cause the data structure to become corrupted or invalid in case of power failures, crashes, or other system failures. As described above, the load dependency graph 218 includes a number of load dependencies between persistent memory 128 locations. A directed edge in the load dependency graph 218 from node A to node B represents that a memory load of A depends on memory B. The directed edge also means that a store of memory A must persist before a store of B. Therefore, the load dependency graph 218 also describes the memory store persistence order. One potential embodiment of a method for identifying persistent memory store commit points using the load dependency graph 218 is described further below in connection with FIGS. 9-10.

In some embodiments, in block 324 the computing device 100 may identify groups of persistent memory 128 stores that should be committed atomically in order to keep the data structure in an uncorrupted or valid state. As described above, the load dependency graph 218 includes load dependencies that indicate that a load of a memory location A depends on a memory location B, and that if a load of A depends on B, then a store of A needs to persist before a store of B persists. In some embodiments, circular dependencies may exist in the load dependency graph 218 between A and B. In those circumstances, because load of A depends on load of B, store of A needs to persist before store of B persists, and because load of B depends on load of A, store of B has to persist before store of A persists. To those dependencies, the store of A and the store of B have to persist atomically. In other words, if there is a cycle in the load dependency graph 218, stores of all memory in the cycle need to persist atomically. One potential embodiment of a method for identifying groups of persistent memory 128 stores to commit atomically is described further below in connection with FIGS. 11-12. After analyzing the load dependency graph 218, the method 300 loops back to block 302, in which the computing device 100 may continue analyzing target programs.

Figure 4:
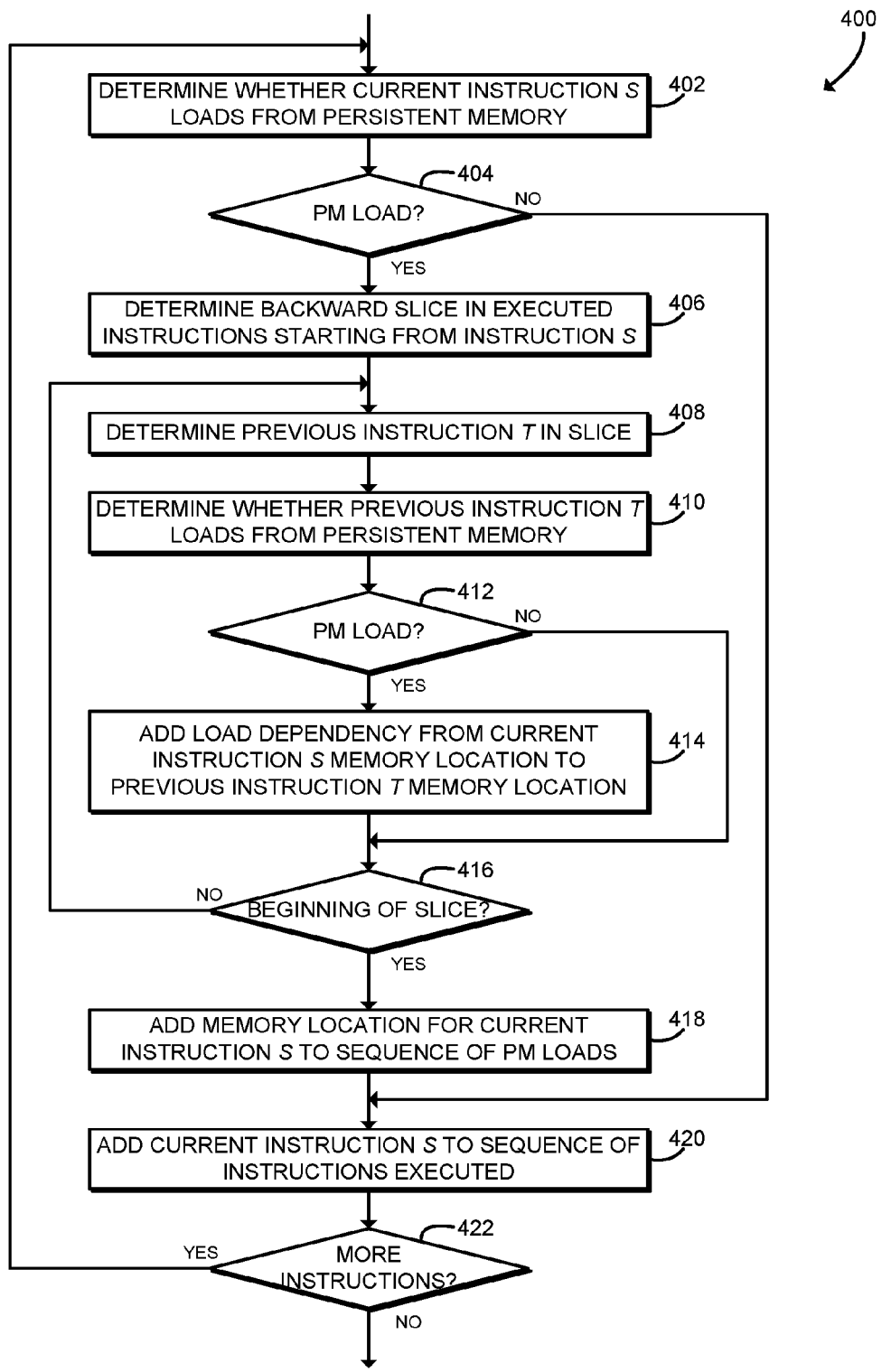
FIG. 4 is a simplified flow diagram of at least one embodiment of a method for determining load dependencies that may be executed by the computing device of FIGS. 1-2.

Referring now to FIG. 4, in use, the computing device 100 may execute a method 400 for generating a load dependency graph 218. The method 400 may be executed while executing the target persistent memory 128 program or another program that accesses data stored in the persistent memory 128 by the target program. In particular, the method 400 may be executed while tracing or otherwise analyzing each instruction of a program that accesses data stored in the persistent memory 128 by the target program. The method 400 begins in block 402, in which the computing device 100 determines whether a current instruction S loads from the persistent memory 128. In block 404, the computing device 100 checks whether the current instruction loads from the persistent memory 128. If not, the method 400 branches ahead to block 420, described below. If the current instruction loads from the persistent memory 128, the method 400 advances to block 406.

In block 406, the computing device 100 determines a backward slice in the previously executed instructions starting from the current instruction S. The backward slice includes previously executed instructions that the current instruction S depends on directly or indirectly, including data dependencies and control dependencies. As described above, the computing device 100 may use any appropriate technique to perform dynamic backward slicing. For example, the computing device 100 may perform dynamic slicing as described in Yan Wang et al., "*DrDebug: Deterministic Replay based Cyclic Debugging with Dynamic Slicing.*"

In block 408, the computing device 100 determines the previous instruction T in the backward slice. In other words, the computing device 100 iterates backward through the slice toward the beginning of program execution. In block 410, the computing device 100 determines whether the instruction T loads from the persistent memory 128. For example, the computing device 100 may determine whether any memory location loaded by the instruction T is included in a range of addresses associated with the persistent memory 128. In block 412, the computing device 100 checks whether the instruction T loads from the persistent memory 128. If not, the method 400 branches ahead to block 416, described below. If the instruction T loads from the persistent memory 128, the method 400 advances to block 414.

In block 414, the computing device 100 adds a load dependency to the load dependency graph 218 from the memory location associated with the current instruction S to the memory location associated with the previous instruction T. As described above, the load dependency indicates that a load of the memory location associated with S depends on the memory location associated with the previous instruction T. As described above, for the memory locations associated with the instructions S and T to remain valid, a store of the memory location associated with S must persist before a store of the memory location associated with T persists. To make the load dependency graph 218 usable during the replay phase (e.g., block 318 of FIG. 3), the memory offset, instead of the memory address, may be used to represent each memory location.

In block 416, the computing device 100 determines whether the beginning of the backward slice has been reached. The computing device 100 may determine, for example, whether any additional instructions are included in the slice beyond the instruction T toward the beginning of program execution. If the computing device 100 has not reached the beginning of the backward slice, the method 400 loops back to block 408 to continue iterating backward through the slice. If the computing device 100 has reached the end of the slice, the method 400 advances to block 418.

In block 418, the computing device 100 adds the memory location associated with the current instruction S to a stored sequence of persistent memory 128 loads. In block 420, the computing device 100 adds the current instruction S to the sequence of instructions executed. As described above in connection with block 406, the sequence of instructions executed may be used for backward slicing. Thus, the instruction S may now be included in a backward slice determined in subsequent iterations.

In block 422, the computing device 100 determines whether additional instructions remain to be processed. If so, the method 400 loops back to block 402 to continue analyzing the next instruction S. If no additional instructions remain, the method 400 is completed. After completion of the method 400, the load dependency graph 218 for the target persistent memory program is also completed. After completion, the persistent memory store events 216 may be analyzed using the load dependency graph 218 as described above in connection with block 318 of FIG. 3.

Referring now to FIG. 5, the computing device 100 may execute a method as shown in pseudocode 500 to construct the load dependency graph 218. In particular, the pseudocode 500 includes a function ConstructLoadDependencyGraph that may correspond to the functions of the method 400 of FIG. 4 and/or the block 314 of FIG. 3. The illustrative pseudocode 500 further includes a GRAPH G that may correspond to the load dependency graph 218.

Figure 6:
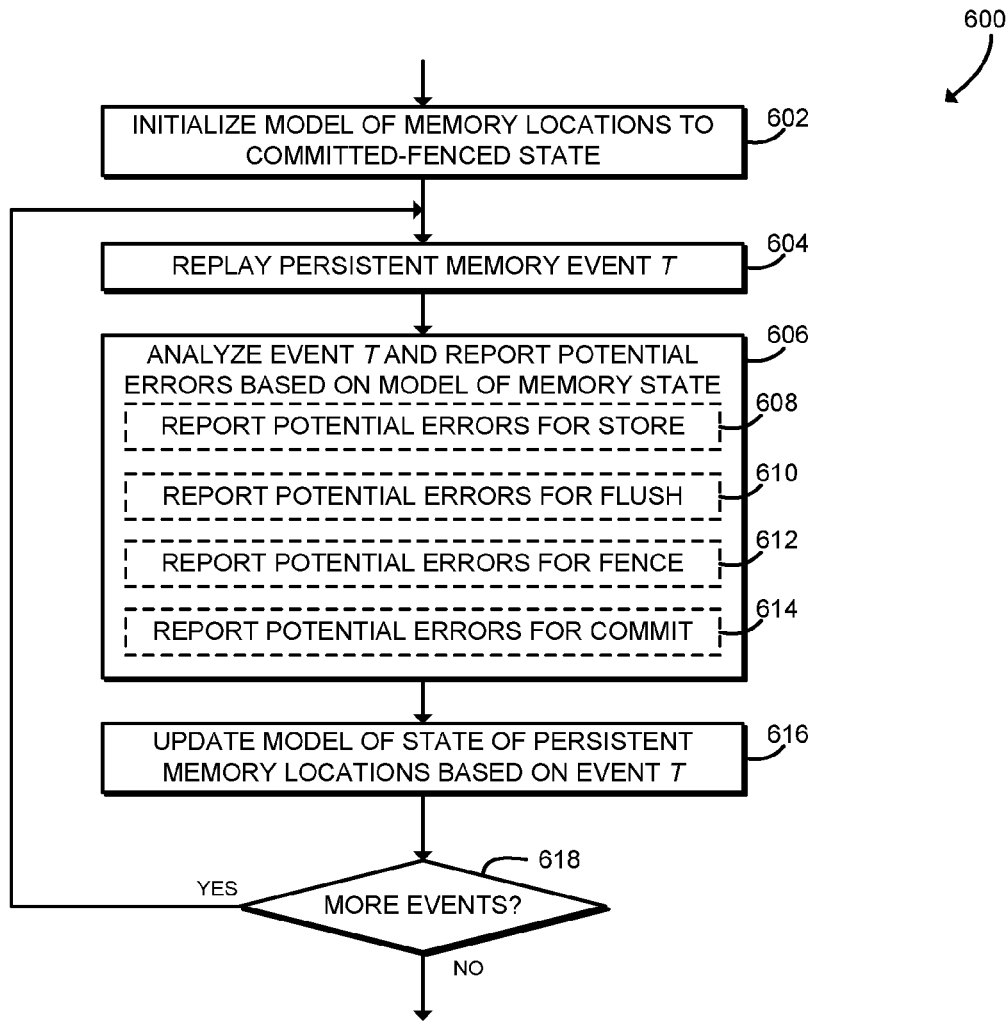
FIG. 6 is a simplified flow diagram of at least one embodiment of a method for detecting persistency programming errors that may be executed by the computing device of FIGS. 1-2.

Referring now to FIG. 6, in use, the computing device 100 may execute a method 600 for identifying potential persistent memory 128 programming errors. The method 600 may be executed while replaying persistent memory store events 216 and analyzing the persistent memory store events 216 using the load dependency graph 218 as described above in connection with blocks 316, 318 of FIG. 3. The method 600 begins in block 602, in which the computing device 100 initializes a state model of all locations in the persistent memory 128 to a committed-fenced state. The state model may include state information for the persistent memory 128. As described further below, each persistent memory 128 location may be in a committed-fenced state (the default), a stored state, a flushed state, a flushed-fenced state, or a committed state. The computing device 100 may track memory states, for example, by maintaining a set or other data structure identifying the persistent memory 128 locations included in each of the potential states. In some embodiments, the persistent memory 128 locations in the committed-fenced state may not be stored, because the committed-fenced state is the default.

In block 604, the computing device 100 replays a persistent memory event T from the persistent memory store events 216. As described above in connection with block 304 of FIG. 3, the persistent memory store events 216 may be recorded by the computing device 100 during an earlier execution of a target persistent memory program. As described above in connection with FIG. 3, the persistent memory store events 216 may include stored persistent memory store events as well as persistent memory flush, commit, and/or fence events. As described above, for each event, the computing device 100 may have recorded a 6-tuple of <tid, ip, type, base, offset, size> on a non-volatile device.

In block 606, the computing device 100 reports potential errors upon replaying and analyzing the event T based on the model of the state of the persistent memory 128. The computing device 100 may, for example, switch on the type value associated with the event T and perform one or more tests of the state model based on the event type. In some embodiments, in block 608 the computing device 100 may report potential errors for a store event. For example, the computing device 100 may identify memory locations L that the target memory location of the store event T depends on and report if any of those locations L have been stored but not flushed or committed, flushed but not fenced after the flush, flushed but not committed, and/or committed but not fenced after the commit In some embodiments, in block 610 the computing device 100 may report potential errors for a cache line flush event. For example, the computing device 100 may report redundant cache line flushes. In some embodiments, in block 612 the computing device 100 may report potential errors for a store fence event. In some embodiments, in block 614 the computing device 100 may report potential errors for a persistent memory 128 commit event. For example, the computing device 100 may report if a store fence is missing before the commit event or if the commit event is redundant.

Figure 7:
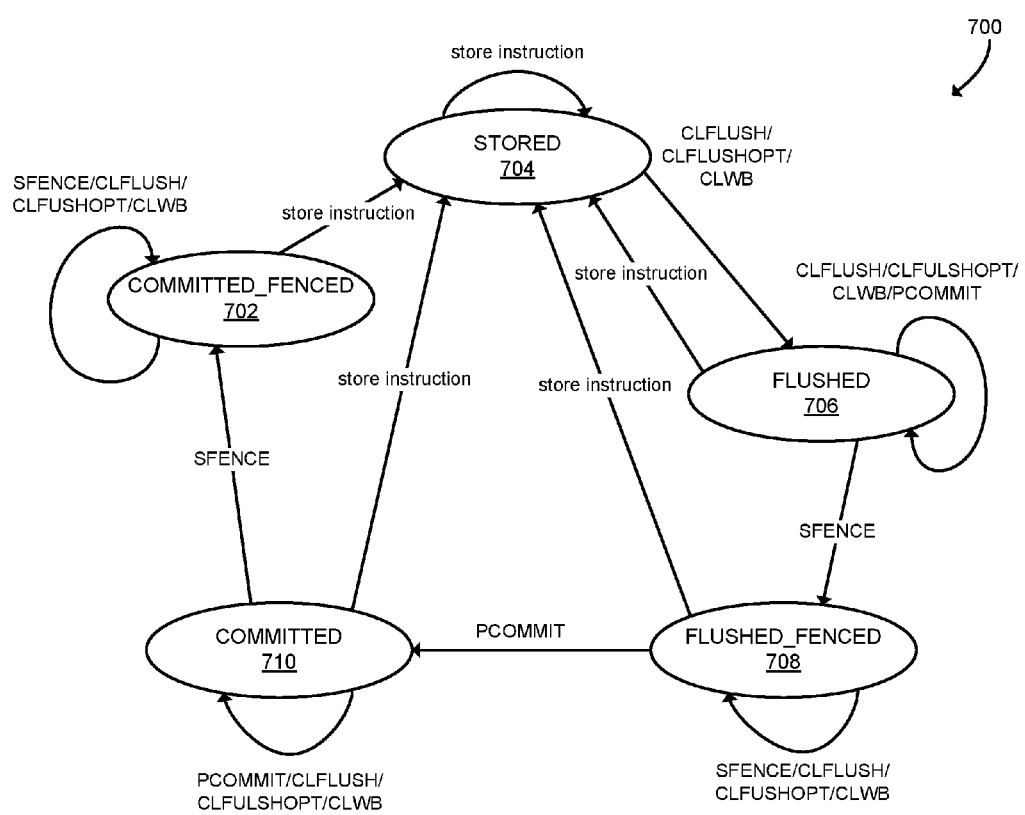
FIG. 7 is a state transition diagram illustrating at least one embodiment of states of a persistent memory location that may be modeled by the method of FIG. 6.

In block 616, the computing device 100 updates the model of the state of the persistent memory 128 based on the persistent memory 128 event T. The state associated with each location in the persistent memory 128 operated upon by the event T may be updated based on the type of event T. Referring now to FIG. 7, state transition diagram 700 illustrates potential states and state transitions for locations in the persistent memory 128. The computing device 100 may update the state model as described above in connection with block 616 of FIG. 6 based on the state transition diagram 700. As shown, a persistent memory 128 location may be in one of the five states: a COMMITTED_FENCED state 702, a STORED state 704, a FLUSHED state 706, a FLUSHED_FENCED state 708, and a COMMITTED state 710. As described above, each memory location may start in the COMMITTED_FENCED state 702 and may transition to the STORED state 704 in response to a memory store instruction. Each location may transition from the STORED state 704 to the FLUSHED state 706 in response to the location being flushed out of the cache to the memory subsystem buffers (e.g., in response to a CLFLUSH, CLFLUSHOPT, and/or CLWB instruction). Each location may transition from the FLUSHED state 706 to the FLUSHED_FENCED state 708 in response to a memory fence event (e.g., an SFENCE instruction). Each location may transition from the FLUSHED_FENCED state 708 to the COMMITTED state 710 in response to the location being committed to the persistent memory 128 (e.g., by a PCOMMIT instruction). Each location may transition from the COMMITTED state 710 to the COMMITTED_FENCED state 702 in response to a memory fence event (e.g., an SFENCE instruction). As described above, each memory location starts in the COMMITTED_FENCED state 702 and may transition to other states upon replay of relevant persistent memory events. Instructions that have no effect on the state, for example, memory load instructions, are not included or shown in the diagram 700.

Referring back to FIG. 6, after updating the persistent memory 128 state model, in block 618 the computing device 100 determines whether additional persistent memory store events remain to be replayed. If so, the method 600 loops back to block 602 to replay the next persistent store event T. If no further persistent memory events remain, the method 600 is completed.

Referring now to FIGS. 8A and 8B, the computing device 100 may execute a method as shown in pseudocode 800 to detect persistency programming errors. In particular, the pseudocode 800 includes a function DetectPersistencyProgrammingErrors that may correspond to the functions of the method 600 of FIG. 6 and/or the block 320 of FIG. 3. The illustrative function DetectPersistencyProgrammingErrors is passed a parameter GRAPH G that may correspond to the load dependency graph 218. As shown, the pseudocode 800 does not need to include a data structure such as a set to track committed and fenced persistent memory locations 128 because, if a memory location is not in any of the other states, it is in the COMMITTED_FENCED state 702.

Figure 9:
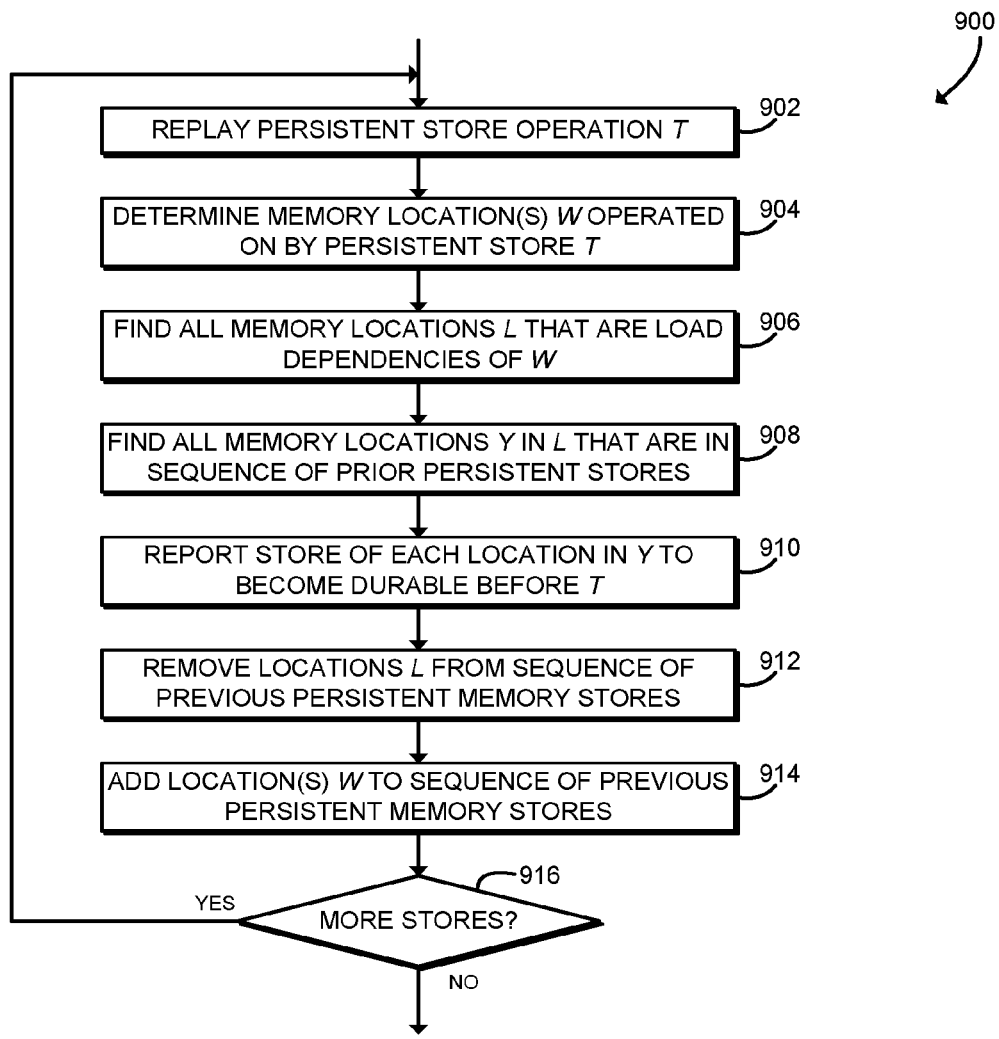
FIG. 9 is a simplified flow diagram of at least one embodiment of a method for discovering store commit points that may be executed by the computing device of FIGS. 1-2.

Referring now to FIG. 9, in use, the computing device 100 may execute a method 900 for identifying persistent memory 128 store commit points. The method 900 may be executed while replaying persistent memory store events 216 and analyzing the persistent memory store events 216 using the load dependency graph 218 as described above in connection with blocks 316, 318 of FIG. 3. The method 900 begins in block 902, in which the computing device 100 replays a persistent memory store operation T from the persistent memory store events 216. As described above in connection with block 304 of FIG. 3, the persistent memory store events 216 may be recorded by the computing device 100 during an earlier execution of a target persistent memory program.

In block 904, the computing device 100 determines the locations W in the persistent memory 128 that are operated on by the persistent store operation T. For example, the computing device 100 may identify the address of the target location of a store instruction in the persistent memory 128. The computing device 100 may determine the memory locations W using the base, offset, and size information recorded for the persistent store operation T.

In block 906, the computing device 100 finds all memory locations L in the persistent memory 128 that are load dependencies of W. As described above, the load dependency graph 218 may include a number of load dependencies between persistent memory 128 locations. A directed edge in the load dependency graph 218 from node A to node B represents that a memory load of A depends on a memory B. Thus, the computing device 100 may traverse the load dependency graph 218 along directed edges starting at the node(s) corresponding to the memory locations W to determine the memory locations L that are load dependencies of W.

In block 908, the computing device 100 finds all memory locations Y in the memory locations L that are included in the sequence of prior persistent store operations. For example, during replay of the persistent memory store events 216, the computing device 100 may maintain a sequence, queue, or other data structure identifying persistent store operations that have been replayed. The computing device 100 may identify the memory locations Y as those memory locations in the queue of prior persistent store operations that are also found in L.

In block 910, the computing device 100 reports that a store of each location in Y should become durable before the store operation T. In other words, the computing device 100 reports a persistent memory commit point in the target program for each persistent memory 128 location in Y. To ensure the validity of persistent memory structures and prevent potential data corruption, the target program should commit all of the store operations associated with the locations in Y prior to executing the store operation T. For example, in some embodiments, the target program should include instructions to flush, commit, and memory-fence each of the locations in Y.

In block 912, the computing device 100 removes the locations L from the sequence of previous persistent memory stores. Thus, after a store operation to W, all of the stores to the locations L are considered committed and will no longer be evaluated for finding persistent memory commit points. In block 914, the computing device 100 adds the locations W to the sequence of persistent memory stores. Thus, subsequent persistent memory store operations may evaluate the locations W when finding persistent memory commit points.

In block 916, the computing device 100 determines whether additional persistent memory store operations remain to be replayed. If so, the method 900 loops back to block 902 to replay the next persistent store operation T. If no further persistent memory store operations remain, the method 900 is completed. After completion, the method 900 may be repeated to continue analyzing target programs, as described above in connection with FIG. 3.

Referring now to FIG. 10, the computing device 100 may execute a method as shown in pseudocode 1000 to discover store commit points. The pseudocode 1000 includes a function DiscoverStoreCommitPoints that may correspond to the method 900 of FIG. 9 and/or the block 322 of FIG. 3. The illustrative function DiscoverStoreCommitPoints is passed a parameter GRAPH G that may correspond to the load dependency graph 218.

Figure 11:
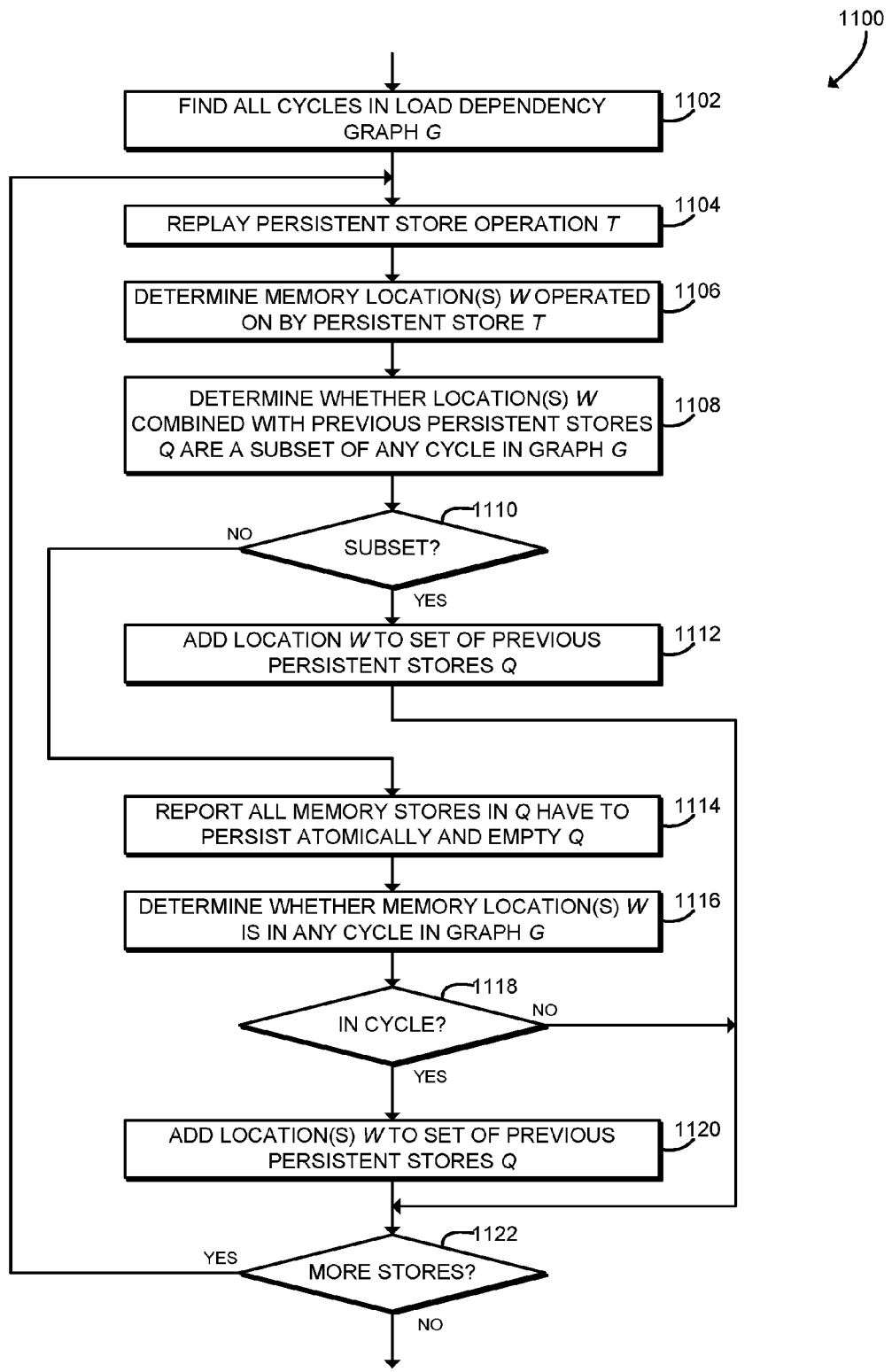
FIG. 11 is a simplified flow diagram of at least one embodiment of a method for discovering stores to persist atomically that may be executed by the computing device of FIGS. 1-2.

Referring now to FIG. 11, in use, the computing device 100 may execute a method 1100 for identifying groups of persistent memory 128 stores that should be committed atomically. The method 1100 may be executed while replaying persistent memory store events 216 and analyzing the persistent memory store events 216 using the load dependency graph 218 as described above in connection with blocks 316, 318 of FIG. 3. The method 1100 begins in block 1102, in which the computing device 100 finds all cycles in the load dependency graph 218. As described above, the load dependency graph 218 includes load dependencies that indicate that a load of a memory location A depends on a memory location B, and that if the load of A depends on B, then a store of A needs to persist before a store of B persists. In some embodiments, circular dependencies may exist in the load dependency graph 218 between A and B. The computing device 100 may use any appropriate algorithm or other technique to identify cycles in the load dependency graph 218.

In block 1104, the computing device 100 replays a persistent memory store operation T from the persistent memory store events 216. As described above in connection with block 304 of FIG. 3, the persistent memory store events 216 may be recorded by the computing device 100 during an earlier execution of a target persistent memory program.

In block 1106, the computing device 100 determines the locations W in the persistent memory 128 that are operated on by the persistent store operation T. For example, the computing device 100 may identify the address of the target location of a store instruction in the persistent memory 128. The computing device 100 may determine the memory locations W using the base, offset, and size information recorded for the persistent store operation T.

In block 1108, the computing device 100 determines whether the location(s) W combined with the locations of previous persistent stores Q are a subset of any cycle in the load dependency graph 218. As described further below, during replay of the persistent memory store events 216, the computing device 100 may maintain a set data structure Q that identifies memory locations that have been operated on by persistent store instructions that are already replayed and that are also on a cycle in the load dependency graph. The computing device 100 may use any appropriate algorithm or other technique to determine whether the union of W and Q is a subset of any cycle in the load dependency graph 218. In block 1110, the computing device 100 checks whether those locations are a subset. If not, the method 1100 branches ahead to block 1114, described further below. If the memory locations are a subset of a cycle, the method 1100 advances to block 1112.

In block 1112, the computing device 100 adds the location(s) W to the set of previous persistent stores Q. After updating the set of previous persistent stores Q, the method 1100 branches ahead to block 1122 to determine whether additional stores remain to be replayed, as described further below.

Referring back to block 1110, if the location(s) W combined with the locations of the previous persistent stores Q are not a subset of any cycle, the method 1100 branches ahead to block 1114. In block 1114, the computing device 100 reports that all of the persistent memory stores in the set Q should be persisted atomically if the set Q is not empty. The computing device 100 has determined that all of the locations in the set Q are part of a cycle in the load dependency graph 218. Thus, to satisfy the circular load dependencies and prevent potential data corruption, all of the locations in the set Q should be committed atomically to the persistent memory 128. The computing device 100 may use any appropriate technique to persist the stores atomically, which may depend upon the particular programming language, runtime environment, platform hardware, and/or other components in use by the computing device 100. After reporting that the persistent stores should be committed atomically, the computing device 100 empties the set of the persistent memory stores Q.

In block 1116, the computing device 100 determines whether the memory location(s) W, operated on by persistent store instruction T, are included in any cycle of the load dependency graph 218. In block 1118, the computing device 100 checks whether W is included in any cycle. If not, the method 1100 branches ahead to block 1122, to determine whether additional stores remain to be replayed, as described further below. If W is included in any cycle, the method 1100 advances to block 1120, in which the computing device 100 adds the location(s) W to the set of previous persistent stores Q. As described above in connection with block 1110, when processing a subsequent iteration, the computing device 100 may report that those locations should be persisted atomically.

In block 1122, the computing device 100 determines whether additional persistent memory store operations remain to be replayed. If so, the method 1100 loops back to block 1104 to replay the next persistent store operation T. If no further persistent memory store operations remain, the method 1100 is completed.

Referring now to FIG. 12, the computing device 100 may execute a method as shown in pseudocode 1200 to discover stores to persist atomically. The pseudocode 1200 includes a function DiscoverStoresToPersistAtomically that may correspond to the method 1100 of FIG. 11 and/or the block 324 of FIG. 3. The illustrative function DiscoverStoresToPersistAtomically is passed a parameter GRAPH G that may correspond to the load dependency graph 218.

It should be appreciated that, in some embodiments, the methods 300, 400, 600, 900, and/or 1100 may be embodied as various instructions stored on a computer-readable media, which may be executed by the processor 120, the I/O subsystem 122, and/or other components of the computing device 100 to cause the computing device 100 to perform the corresponding method 300, 400, 600, 900, and/or 1100. The computer-readable media may be embodied as any type of media capable of being read by the computing device 100 including, but not limited to, the memory 124, the data storage device 130, firmware devices, and/or other media.

EXAMPLES

Illustrative examples of the technologies disclosed herein are provided below. An embodiment of the technologies may include any one or more, and any combination of, the examples described below.

Example 1 includes a computing device for analyzing a persistent memory program, the computing device comprising: an instrumentation module to (i) execute a persistent memory program, wherein the persistent memory program includes one or more store operations to a persistent memory of the computing device, and (ii) record persistent memory store events of the persistent memory program in response to execution of the persistent memory program; a dependency module to generate a load dependency graph of the persistent memory program in response to execution of the persistent memory program; a replay module to replay the persistent memory store events; and an analysis module to analyze the persistent memory store events with the load dependency graph in response to a replay of the persistent memory store events.

Example 2 includes the subject matter of Example 1, and wherein to record the persistent memory store events comprises to record a store operation to the persistent memory of the persistent memory program.

Example 3 includes the subject matter of any of Examples 1 and 2, and wherein to record the persistent memory store events comprises to record a persistent memory flush event, a persistent memory commit event, or a persistent memory fence event.

Example 4 includes the subject matter of any of Examples 1-3, and wherein to generate the load dependency graph of the persistent memory program comprises to extract persistent memory load events from the persistent memory program.

Example 5 includes the subject matter of any of Examples 1-4, and wherein to generate the load dependency graph of the persistent memory program comprises to extract persistent memory load events from a second persistent memory program, wherein the second persistent memory program includes one or more load operations to the persistent memory of the computing device, and wherein the load operations target data stored by the one or more store operations of the persistent memory program.

Example 6 includes the subject matter of any of Examples 1-5, and wherein to generate the load dependency graph comprises to generate a load dependency between a first persistent memory location and a second persistent memory location, wherein a first load of the first persistent memory location occurs after a second load of the second persistent memory location, and wherein the first load of the first persistent memory location depends on the second persistent memory location.

Example 7 includes the subject matter of any of Examples 1-6, and wherein the first load of the first persistent memory location has a data dependency to the second persistent memory location or a control dependency to the second persistent memory location.

Example 8 includes the subject matter of any of Examples 1-7, and wherein to generate the load dependency graph comprises to: determine a first persistent memory load instruction associated with a first persistent memory location; determine a backward slice of a persistent memory program from the first persistent memory load instruction; determine a second persistent memory load instruction of the backward slice, wherein the second persistent memory load instruction occurred before the first persistent memory load instruction, and wherein the second persistent memory load instruction is associated with a second persistent memory location; and add a load dependency between the first persistent memory location and the second persistent memory location to the load dependency graph.

Example 9 includes the subject matter of any of Examples 1-8, and wherein to analyze the persistent memory store events with the load dependency graph comprises to identify one or more persistency programming errors of the persistent memory program based on the load dependency graph.

Example 10 includes the subject matter of any of Examples 1-9, and wherein to identify the one or more persistency programming errors of the persistent memory program based on the load dependency graph comprises to: replay a persistent memory event, wherein the persistent memory event has an event type; determine potential errors based on the event type of the persistent memory event and a state model of the persistent memory; and update the state model of the persistent memory as a function of the persistent memory event.

Example 11 includes the subject matter of any of Examples 1-10, and wherein to determine potential errors based on the event type of the persistent memory event and a state model of the persistent memory comprises to: determine whether the event type of the persistent memory event is store; determine a first persistent memory location in response to a determination that the event type of the persistent memory event is store, wherein the persistent memory event is associated with a second persistent memory location and wherein the load dependency graph includes a load dependency between the second persistent memory location and the first persistent memory location; and determine whether the first persistent memory location is in a stored state, a flushed state, a flushed-fenced state, or a committed-unfenced state.

Example 12 includes the subject matter of any of Examples 1-11, and wherein to determine potential errors based on the event type of the persistent memory event and a state model of the persistent memory comprises to: determine whether the event type of the persistent memory event is flush; determine a cache line address associated with the persistent memory event in response to a determination that the event type of the persistent memory event is flush; and determine whether the cache line address is in a stored state.

Example 13 includes the subject matter of any of Examples 1-12, and wherein to determine potential errors based on the event type of the persistent memory event and a state model of the persistent memory comprises to: determine whether the event type of the persistent memory event is commit; and determine whether any persistent memory location is in a flushed state in response to a determination that the event type of the persistent memory event is commit.

Example 14 includes the subject matter of any of Examples 1-13, and wherein to determine potential errors based on the event type of the persistent memory event and a state model of the persistent memory comprises to: determine whether the event type of the persistent memory event is commit; and determine whether no persistent memory locations are in a flushed state and no persistent memory locations are in a flushed-fenced state in response to a determination that the event type of the persistent memory event is commit.

Example 15 includes the subject matter of any of Examples 1-14, and wherein to analyze the persistent memory store events with the load dependency graph comprises to identify one or more persistent memory commit points of the persistent memory program based on the load dependency graph.

Example 16 includes the subject matter of any of Examples 1-15, and wherein a persistent memory commit point of the one or more persistent memory commit points comprises a first persistent memory store operation associated with a first persistent memory location, wherein the load dependency graph includes a load dependency between the first persistent memory location and a second persistent memory location, and wherein the second persistent memory location is associated with a second persistent memory store operation, wherein the second persistent memory store operation occurred in the persistent memory program prior to the first persistent memory store operation.

Example 17 includes the subject matter of any of Examples 1-16, and wherein to identify the one or more persistent memory commit points comprises to: replay a first persistent memory store operation associated with a first persistent memory location; find a second persistent memory location, wherein the load dependency graph includes a load dependency between the first persistent memory location and the second persistent memory location; determine whether a second persistent memory store operation associated with the second persistent memory location occurred in the persistent memory program prior to the first persistent memory store operation; and report a persistent memory commit point at the first persistent memory store operation in response to a determination that the second persistent memory store operation associated with the second persistent memory location occurred in the persistent memory program prior to the first persistent memory store operation.

Example 18 includes the subject matter of any of Examples 1-17, and wherein to analyze the persistent memory store events with the load dependency graph comprises to identify a plurality of persistent memory store operations to persist atomically based on the load dependency graph.

Example 19 includes the subject matter of any of Examples 1-18, and wherein the plurality of persistent memory store operations comprises a first persistent memory store operation associated with a first persistent memory location and a second persistent memory store operation associated with a second persistent memory location, wherein the load dependency graph includes a dependency cycle, and wherein the dependency cycle includes the first persistent memory location and the second persistent memory location.

Example 20 includes the subject matter of any of Examples 1-19, and wherein to identify the plurality of persistent memory store operations to persist atomically comprises to: identify a first persistent memory store operation associated with a first persistent memory location; and identify a second persistent memory store operation associated with a second persistent memory location, wherein the load dependency graph includes a dependency cycle, wherein the dependency cycle includes the first persistent memory location and the second persistent memory location.

Example 21 includes a method for analyzing a persistent memory program, the method comprising: executing, by a computing device, a persistent memory program, wherein the persistent memory program includes one or more store operations to a persistent memory of the computing device; recording, by the computing device, persistent memory store events of the persistent memory program in response to executing the persistent memory program; generating, by the computing device, a load dependency graph of the persistent memory program in response to executing the persistent memory program; replaying, by the computing device, the persistent memory store events; and analyzing, by the computing device, the persistent memory store events using the load dependency graph in response to replaying the persistent memory store events.

Example 22 includes the subject matter of Example 21, and wherein recording the persistent memory store events comprises recording a store operation to the persistent memory of the persistent memory program.

Example 23 includes the subject matter of any of Examples 21 and 22, and wherein recording the persistent memory store events comprises recording a persistent memory flush event, recording a persistent memory commit event, or recording a persistent memory fence event.

Example 24 includes the subject matter of any of Examples 21-23, and wherein generating the load dependency graph of the persistent memory program comprises extracting persistent memory load events from the persistent memory program.

Example 25 includes the subject matter of any of Examples 21-24, and wherein generating the load dependency graph of the persistent memory program comprises extracting persistent memory load events from a second persistent memory program, wherein the second persistent memory program includes one or more load operations to the persistent memory of the computing device, and wherein the load operations target data stored by the one or more store operations of the persistent memory program.

Example 26 includes the subject matter of any of Examples 21-25, and wherein generating the load dependency graph comprises generating a load dependency between a first persistent memory location and a second persistent memory location, wherein a first load of the first persistent memory location occurs after a second load of the second persistent memory location, and wherein the first load of the first persistent memory location depends on the second persistent memory location.

Example 27 includes the subject matter of any of Examples 21-26, and wherein the first load of the first persistent memory location has a data dependency to the second persistent memory location or a control dependency to the second persistent memory location.

Example 28 includes the subject matter of any of Examples 21-27, and wherein generating the load dependency graph comprises: determining a first persistent memory load instruction associated with a first persistent memory location; determining a backward slice of a persistent memory program starting at the first persistent memory load instruction; determining a second persistent memory load instruction of the backward slice, wherein the second persistent memory load instruction occurred before the first persistent memory load instruction, and wherein the second persistent memory load instruction is associated with a second persistent memory location; and adding a load dependency between the first persistent memory location and the second persistent memory location to the load dependency graph.

Example 29 includes the subject matter of any of Examples 21-28, and wherein analyzing the persistent memory store events using the load dependency graph comprises identifying one or more persistency programming errors of the persistent memory program based on the load dependency graph.

Example 30 includes the subject matter of any of Examples 21-29, and wherein identifying the one or more persistency programming errors of the persistent memory program based on the load dependency graph comprises: replaying a persistent memory event, wherein the persistent memory event has an event type; determining potential errors based on the event type of the persistent memory event and a state model of the persistent memory; and updating the state model of the persistent memory as a function of the persistent memory event.

Example 31 includes the subject matter of any of Examples 21-30, and wherein determining potential errors based on the event type of the persistent memory event and a state model of the persistent memory comprises: determining whether the event type of the persistent memory event is store; determining a first persistent memory location in response to determining that the event type of the persistent memory event is store, wherein the persistent memory event is associated with a second persistent memory location and wherein the load dependency graph includes a load dependency between the second persistent memory location and the first persistent memory location; and determining whether the first persistent memory location is in a stored state, a flushed state, a flushed-fenced state, or a committed-unfenced state.

Example 32 includes the subject matter of any of Examples 21-31, and wherein determining potential errors based on the event type of the persistent memory event and a state model of the persistent memory comprises: determining whether the event type of the persistent memory event is flush; determining a cache line address associated with the persistent memory event in response to determining that the event type of the persistent memory event is flush; and determining whether the cache line address is in a stored state.

Example 33 includes the subject matter of any of Examples 21-32, and wherein determining potential errors based on the event type of the persistent memory event and a state model of the persistent memory comprises: determining whether the event type of the persistent memory event is commit; and determining whether any persistent memory location is in a flushed state in response to determining that the event type of the persistent memory event is commit.

Example 34 includes the subject matter of any of Examples 21-33, and wherein determining potential errors based on the event type of the persistent memory event and a state model of the persistent memory comprises: determining whether the event type of the persistent memory event is commit; and determining whether no persistent memory location are in a flushed state and no persistent memory locations are in a flushed-fenced state in response to determining that the event type of the persistent memory event is commit.

Example 35 includes the subject matter of any of Examples 21-34, and wherein analyzing the persistent memory store events using the load dependency graph comprises identifying one or more persistent memory commit points of the persistent memory program based on the load dependency graph.

Example 36 includes the subject matter of any of Examples 21-35, and wherein identifying the one or more persistent memory commit points comprises identifying a first persistent memory store operation associated with a first persistent memory location, wherein the load dependency graph includes a load dependency between the first persistent memory location and a second persistent memory location, and wherein the second persistent memory location is associated with a second persistent memory store operation, wherein the second persistent memory store operation occurred in the persistent memory program prior to the first persistent memory store operation.

Example 37 includes the subject matter of any of Examples 21-36, and wherein identifying the one or more persistent memory commit points comprises: replaying a first persistent memory store operation associated with a first persistent memory location; finding a second persistent memory location, wherein the load dependency graph includes a load dependency between the first persistent memory location and the second persistent memory location; determining whether a second persistent memory store operation associated with the second persistent memory location occurred in the persistent memory program prior to the first persistent memory store operation; and reporting a persistent memory commit point at the first persistent memory store operation in response to determining that the second persistent memory store operation associated with the second persistent memory location occurred in the persistent memory program prior to the first persistent memory store operation.

Example 38 includes the subject matter of any of Examples 21-37, and wherein analyzing the persistent memory store events using the load dependency graph comprises identifying a plurality of persistent memory store operations to persist atomically based on the load dependency graph.

Example 39 includes the subject matter of any of Examples 21-38, and wherein the plurality of persistent memory store operations comprises a first persistent memory store operation associated with a first persistent memory location and a second persistent memory store operation associated with a second persistent memory location, wherein the load dependency graph includes a dependency cycle, and wherein the dependency cycle includes the first persistent memory location and the second persistent memory location.

Example 40 includes the subject matter of any of Examples 21-39, and wherein identifying the plurality of persistent memory store operations to persist atomically comprises: identifying a first persistent memory store operation associated with a first persistent memory location; and identifying a second persistent memory store operation associated with a second persistent memory location, wherein the load dependency graph includes a dependency cycle, wherein the dependency cycle includes the first persistent memory location and the second persistent memory location.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for analyzing a persistent memory program, the computing device comprising: means for executing a persistent memory program, wherein the persistent memory program includes one or more store operations to a persistent memory of the computing device; means for recording persistent memory store events of the persistent memory program in response to executing the persistent memory program; means for generating a load dependency graph of the persistent memory program in response to executing the persistent memory program; means for replaying the persistent memory store events; and means for analyzing the persistent memory store events using the load dependency graph in response to replaying the persistent memory store events.

Example 45 includes the subject matter of Example 44, and wherein the means for recording the persistent memory store events comprises means for recording a store operation to the persistent memory of the persistent memory program.

Example 46 includes the subject matter of any of Examples 44 and 45, and wherein the means for recording the persistent memory store events comprises means for recording a persistent memory flush event, means for recording a persistent memory commit event, or means for recording a persistent memory fence event.

Example 47 includes the subject matter of any of Examples 44-46, and wherein the means for generating the load dependency graph of the persistent memory program comprises means for extracting persistent memory load events from the persistent memory program.

Example 48 includes the subject matter of any of Examples 44-47, and wherein the means for generating the load dependency graph of the persistent memory program comprises means for extracting persistent memory load events from a second persistent memory program, wherein the second persistent memory program includes one or more load operations to the persistent memory of the computing device, and wherein the load operations target data stored by the one or more store operations of the persistent memory program.

Example 49 includes the subject matter of any of Examples 44-48, and wherein the means for generating the load dependency graph comprises means for generating a load dependency between a first persistent memory location and a second persistent memory location, wherein a first load of the first persistent memory location occurs after a second load of the second persistent memory location, and wherein the first load of the first persistent memory location depends on the second persistent memory location.

Example 50 includes the subject matter of any of Examples 44-49, and wherein the first load of the first persistent memory location has a data dependency to the second persistent memory location or a control dependency to the second persistent memory location.

Example 51 includes the subject matter of any of Examples 44-50, and wherein the means for generating the load dependency graph comprises: means for determining a first persistent memory load instruction associated with a first persistent memory location; means for determining a backward slice of a persistent memory program starting at the first persistent memory load instruction; means for determining a second persistent memory load instruction of the backward slice, wherein the second persistent memory load instruction occurred before the first persistent memory load instruction, and wherein the second persistent memory load instruction is associated with a second persistent memory location; and means for adding a load dependency between the first persistent memory location and the second persistent memory location to the load dependency graph.

Example 52 includes the subject matter of any of Examples 44-51, and wherein the means for analyzing the persistent memory store events using the load dependency graph comprises means for identifying one or more persistency programming errors of the persistent memory program based on the load dependency graph.

Example 53 includes the subject matter of any of Examples 44-52, and wherein the means for identifying the one or more persistency programming errors of the persistent memory program based on the load dependency graph comprises: means for replaying a persistent memory event, wherein the persistent memory event has an event type; means for determining potential errors based on the event type of the persistent memory event and a state model of the persistent memory; and means for updating the state model of the persistent memory as a function of the persistent memory event.

Example 54 includes the subject matter of any of Examples 44-53, and wherein the means for determining potential errors based on the event type of the persistent memory event and a state model of the persistent memory comprises: means for determining whether the event type of the persistent memory event is store; means for determining a first persistent memory location in response to determining that the event type of the persistent memory event is store, wherein the persistent memory event is associated with a second persistent memory location and wherein the load dependency graph includes a load dependency between the second persistent memory location and the first persistent memory location; and means for determining whether the first persistent memory location is in a stored state, a flushed state, a flushed-fenced state, or a committed-unfenced state.

Example 55 includes the subject matter of any of Examples 44-54, and wherein the means for determining potential errors based on the event type of the persistent memory event and a state model of the persistent memory comprises: means for determining whether the event type of the persistent memory event is flush; means for determining a cache line address associated with the persistent memory event in response to determining that the event type of the persistent memory event is flush; and means for determining whether the cache line address is in a stored state.

Example 56 includes the subject matter of any of Examples 44-55, and wherein the means for determining potential errors based on the event type of the persistent memory event and a state model of the persistent memory comprises: means for determining whether the event type of the persistent memory event is commit; and means for determining whether any persistent memory location is in a flushed state in response to determining that the event type of the persistent memory event is commit.

Example 57 includes the subject matter of any of Examples 44-56, and wherein the means for determining potential errors based on the event type of the persistent memory event and a state model of the persistent memory comprises: means for determining whether the event type of the persistent memory event is commit; and means for determining whether no persistent memory location are in a flushed state and no persistent memory locations are in a flushed-fenced state in response to determining that the event type of the persistent memory event is commit.

Example 58 includes the subject matter of any of Examples 44-57, and wherein the means for analyzing the persistent memory store events using the load dependency graph comprises means for identifying one or more persistent memory commit points of the persistent memory program based on the load dependency graph.

Example 59 includes the subject matter of any of Examples 44-58, and wherein the means for identifying the one or more persistent memory commit points comprises means for identifying a first persistent memory store operation associated with a first persistent memory location, wherein the load dependency graph includes a load dependency between the first persistent memory location and a second persistent memory location, and wherein the second persistent memory location is associated with a second persistent memory store operation, wherein the second persistent memory store operation occurred in the persistent memory program prior to the first persistent memory store operation.

Example 60 includes the subject matter of any of Examples 44-59, and wherein the means for identifying the one or more persistent memory commit points comprises: means for replaying a first persistent memory store operation associated with a first persistent memory location; means for finding a second persistent memory location, wherein the load dependency graph includes a load dependency between the first persistent memory location and the second persistent memory location; means for determining whether a second persistent memory store operation associated with the second persistent memory location occurred in the persistent memory program prior to the first persistent memory store operation; and means for reporting a persistent memory commit point at the first persistent memory store operation in response to determining that the second persistent memory store operation associated with the second persistent memory location occurred in the persistent memory program prior to the first persistent memory store operation.

Example 61 includes the subject matter of any of Examples 44-60, and wherein the means for analyzing the persistent memory store events using the load dependency graph comprises means for identifying a plurality of persistent memory store operations to persist atomically based on the load dependency graph.

Example 62 includes the subject matter of any of Examples 44-61, and wherein the plurality of persistent memory store operations comprises a first persistent memory store operation associated with a first persistent memory location and a second persistent memory store operation associated with a second persistent memory location, wherein the load dependency graph includes a dependency cycle, and wherein the dependency cycle includes the first persistent memory location and the second persistent memory location.

Example 63 includes the subject matter of any of Examples 44-62, and wherein the means for identifying the plurality of persistent memory store operations to persist atomically comprises: means for identifying a first persistent memory store operation associated with a first persistent memory location; and means for identifying a second persistent memory store operation associated with a second persistent memory location, wherein the load dependency graph includes a dependency cycle, wherein the dependency cycle includes the first persistent memory location and the second persistent memory location.

The invention claimed is:

1. A computing device for analyzing a persistent memory program, the computing device comprising:
   an instrumentation module to (i) execute a persistent memory program, wherein the persistent memory program includes one or more store operations to a persistent memory of the computing device, and (ii) record persistent memory store events of the persistent memory program in response to execution of the persistent memory program;
   a dependency module to generate a load dependency graph of the persistent memory program in response to execution of the persistent memory program;
   a replay module to replay the persistent memory store events; and
   an analysis module to analyze the persistent memory store events with the load dependency graph in response to a replay of the persistent memory store events;
   wherein to generate the load dependency graph comprises to (i) determine a first persistent memory load instruction associated with a first persistent memory location, (ii) determine a backward slice of a persistent memory program from the first persistent memory load instruction, (iii) determine a second persistent memory load instruction of the backward slice, wherein the second persistent memory load instruction occurred before the first persistent memory load instruction, and wherein the second persistent memory load instruction is associated with a second persistent memory location, and (iv) add a load dependency between the first persistent memory location and the second persistent memory location to the load dependency graph.

2. The computing device of claim 1, wherein to generate the load dependency graph of the persistent memory program comprises to extract persistent memory load events from a second persistent memory program, wherein the second persistent memory program includes one or more load operations to the persistent memory of the computing device, and wherein the load operations target data stored by the one or more store operations of the persistent memory program.

3. The computing device of claim 1, wherein to generate the load dependency graph comprises to generate a load dependency between a first persistent memory location and a second persistent memory location, wherein a first load of the first persistent memory location occurs after a second load of the second persistent memory location, and wherein the first load of the first persistent memory location depends on the second persistent memory location.

4. The computing device of claim 1, wherein to analyze the persistent memory store events with the load dependency graph comprises to identify one or more persistency programming errors of the persistent memory program based on the load dependency graph.

5. The computing device of claim 4, wherein to identify the one or more persistency programming errors of the persistent memory program based on the load dependency graph comprises to:
 replay a persistent memory event, wherein the persistent memory event has an event type;
 determine potential errors based on the event type of the persistent memory event and a state model of the persistent memory; and
 update the state model of the persistent memory as a function of the persistent memory event.

6. The computing device of claim 5, wherein to determine potential errors based on the event type of the persistent memory event and a state model of the persistent memory comprises to:
 determine whether the event type of the persistent memory event is store;
 determine a first persistent memory location in response to a determination that the event type of the persistent memory event is store, wherein the persistent memory event is associated with a second persistent memory location and wherein the load dependency graph includes a load dependency between the second persistent memory location and the first persistent memory location; and
 determine whether the first persistent memory location is in a stored state, a flushed state, a flushed-fenced state, or a committed-unfenced state.

7. The computing device of claim 5, wherein to determine potential errors based on the event type of the persistent memory event and a state model of the persistent memory comprises to:
 determine whether the event type of the persistent memory event is flush;
 determine a cache line address associated with the persistent memory event in response to a determination that the event type of the persistent memory event is flush; and
 determine whether the cache line address is in a stored state.

8. The computing device of claim 5, wherein to determine potential errors based on the event type of the persistent memory event and a state model of the persistent memory comprises to:
 determine whether the event type of the persistent memory event is commit; and
 determine whether any persistent memory location is in a flushed state in response to a determination that the event type of the persistent memory event is commit.

9. The computing device of claim 1, wherein to analyze the persistent memory store events with the load dependency graph comprises to identify one or more persistent memory commit points of the persistent memory program based on the load dependency graph.

10. The computing device of claim 9, wherein to identify the one or more persistent memory commit points comprises to:
 replay a first persistent memory store operation associated with a first persistent memory location;
 find a second persistent memory location, wherein the load dependency graph includes a load dependency between the first persistent memory location and the second persistent memory location;
 determine whether a second persistent memory store operation associated with the second persistent memory location occurred in the persistent memory program prior to the first persistent memory store operation; and
 report a persistent memory commit point at the first persistent memory store operation in response to a determination that the second persistent memory store operation associated with the second persistent memory location occurred in the persistent memory program prior to the first persistent memory store operation.

11. The computing device of claim 1, wherein to analyze the persistent memory store events with the load dependency graph comprises to identify a plurality of persistent memory store operations to persist atomically based on the load dependency graph.

12. The computing device of claim 11, wherein to identify the plurality of persistent memory store operations to persist atomically comprises to:
 identify a first persistent memory store operation associated with a first persistent memory location; and
 identify a second persistent memory store operation associated with a second persistent memory location, wherein the load dependency graph includes a dependency cycle, wherein the dependency cycle includes the first persistent memory location and the second persistent memory location.

13. A method for analyzing a persistent memory program, the method comprising:
 executing, by a computing device, a persistent memory program, wherein the persistent memory program includes one or more store operations to a persistent memory of the computing device;
 recording, by the computing device, persistent memory store events of the persistent memory program in response to executing the persistent memory program;
 generating, by the computing device, a load dependency graph of the persistent memory program in response to executing the persistent memory program;
 replaying, by the computing device, the persistent memory store events; and
 analyzing, by the computing device, the persistent memory store events using the load dependency graph in response to replaying the persistent memory store events;
 wherein generating the load dependency graph comprises:
  determining a first persistent memory load instruction associated with a first persistent memory location;
  determining a backward slice of a persistent memory program starting at the first persistent memory load instruction;

determining a second persistent memory load instruction of the backward slice, wherein the second persistent memory load instruction occurred before the first persistent memory load instruction, and wherein the second persistent memory load instruction is associated with a second persistent memory location; and adding a load dependency between the first persistent memory location and the second persistent memory location to the load dependency graph.

14. The method of claim 13, wherein generating the load dependency graph comprises generating a load dependency between a first persistent memory location and a second persistent memory location, wherein a first load of the first persistent memory location occurs after a second load of the second persistent memory location, and wherein the first load of the first persistent memory location depends on the second persistent memory location.

15. The method of claim 13, wherein analyzing the persistent memory store events using the load dependency graph comprises identifying one or more persistency programming errors of the persistent memory program based on the load dependency graph.

16. The method of claim 13, wherein analyzing the persistent memory store events using the load dependency graph comprises identifying one or more persistent memory commit points of the persistent memory program based on the load dependency graph.

17. The method of claim 13, wherein analyzing the persistent memory store events using the load dependency graph comprises identifying a plurality of persistent memory store operations to persist atomically based on the load dependency graph.

18. One or more non-transitory, computer-readable storage media comprising a plurality of instructions that in response to being executed cause a computing device to:

execute a persistent memory program, wherein the persistent memory program includes one or more store operations to a persistent memory of the computing device;

record persistent memory store events of the persistent memory program in response to executing the persistent memory program;

generate a load dependency graph of the persistent memory program in response to executing the persistent memory program;

replay the persistent memory store events; and analyze the persistent memory store events using the load dependency graph in response to replaying the persistent memory store events;

wherein to generate the load dependency graph comprises to:

determine a first persistent memory load instruction associated with a first persistent memory location;

determine a backward slice of a persistent memory program starting at the first persistent memory load instruction;

determine a second persistent memory load instruction of the backward slice, wherein the second persistent memory load instruction occurred before the first persistent memory load instruction, and wherein the second persistent memory load instruction is associated with a second persistent memory location; and add a load dependency between the first persistent memory location and the second persistent memory location to the load dependency graph.

19. The one or more non-transitory, computer-readable storage media of claim 18, wherein to generate the load dependency graph comprises to generate a load dependency between a first persistent memory location and a second persistent memory location, wherein a first load of the first persistent memory location occurs after a second load of the second persistent memory location, and wherein the first load of the first persistent memory location depends on the second persistent memory location.

20. The one or more non-transitory, computer-readable storage media of claim 18, wherein to analyze the persistent memory store events using the load dependency graph comprises to identify one or more persistency programming errors of the persistent memory program based on the load dependency graph.

21. The one or more non-transitory, computer-readable storage media of claim 18, wherein to analyze the persistent memory store events using the load dependency graph comprises to identify one or more persistent memory commit points of the persistent memory program based on the load dependency graph.

22. The one or more non-transitory, computer-readable storage media of claim 18, wherein to analyze the persistent memory store events using the load dependency graph comprises to identify a plurality of persistent memory store operations to persist atomically based on the load dependency graph.

* * * * *